United States Patent [19]
Friedline et al.

[11] 3,911,542
[45] Oct. 14, 1975

[54] ADJUSTABLE TOOL UNIT

[75] Inventors: Ernest J. Friedline, Latrobe; Edward L. Sorice, Crabtree, both of Pa.

[73] Assignee: Kennametal Inc., Latrobe, Pa.

[22] Filed: Aug. 12, 1974

[21] Appl. No.: 496,624

[52] U.S. Cl. .................... 29/96; 408/146; 408/154
[51] Int. Cl.² ......................................... B23B 29/02
[58] Field of Search .......... 408/146, 155, 154, 153, 408/181; 29/96

[56] References Cited
UNITED STATES PATENTS

| | | | |
|---|---|---|---|
| 2,125,005 | 7/1938 | Jearum | 408/146 |
| 3,116,653 | 1/1964 | Lombardo | 408/146 |
| 3,400,616 | 9/1968 | Mihic | 408/146 |
| 3,741,672 | 6/1973 | Hedberg | 408/155 |

*Primary Examiner*—Leonidas Vlachos
*Attorney, Agent, or Firm*—Melvin A. Crosby

[57] ABSTRACT

An adjustable tool unit consisting, in particular, of a cartridge adapted for being fixedly connected to a support with the cartridge including an outer sleeve to be connected to the support and a threaded element in the sleeve. A nut on the threaded element engages one side of the sleeve while a spring acts between the other end of the element and the other side of the sleeve. The threaded element protrudes outwardly from the nut and is formed with a pocket for receiving a cutting insert. The arrangement provides for axial adjustment of the threaded element even while mounted in a support that does not permit access to the end of the element opposite the insert end thereof.

7 Claims, 4 Drawing Figures

ADJUSTABLE TOOL UNIT

The present invention relates to an adjustable cutting tool unit and is particularly concerned with a cartridge type unit adapted for being received in a recess in a support.

Cartridge type units of the nature with which the present invention is concerned are known but, heretofore, there has always been difficulty in arriving at a cartridge type unit which could be mounted in a recess in a support while adjustment of a cutting tool carried by the unit could be effected from the exposed end of the unit.

Adjustment of the cutting tool in one axial direction or the other from the cutting tool end of the unit always involved some difficulty and lack of precision in the amount of movement imparted to the cutting element.

The present invention has as a primary object the provision of a cartridge of the nature referred to in which adjustment of the axial position of the cutting tool carried thereby can be effected readily and with a high degree of accuracy.

Another object is the provision of a cartridge type cutting tool unit which can be simply mounted in a recess in a support and adjustment effected from the exposed end of the unit.

BRIEF SUMMARY OF THE INVENTION

According to the present invention, an adjustable cutting tool unit is provided in which the unit comprises an outer sleeve adapted for being mounted in a recess in a support member and having flange engageable by screws for fixedly connecting the sleeve to the support member. Reciprocably mounted in the sleeve is a threaded element which may comprise a central rod portion and a surrounding tubular threaded portion.

A sliding key, which may be in the form of a pin, is carried by the sleeve and engages registering slots in the aforesaid portions of said threaded element and prevents rotation of the portions within the sleeve while permitting axial movement thereof in the sleeve. The rod portion protrudes beyond one end of the tubular threaded portion and is formed with a pocket for receiving a cutting insert.

The opposite end of the rod portion has connected thereto a retainer which clamps the tubular threaded portion in place on the rod portion and which also provides a bearing for a compression spring bearing between the end of the sleeve and the retainer.

A nut threaded on the tubular threaded portion at the end opposite the aforementioned retainer engages the end of the sleeve and can be rotated to adjust the threaded element axially within the sleeve. Advantageously, a friction element carried by the nut engages the threaded element and provides means for retaining the nut in adjusted positions on the threaded element.

The exact nature of the present invention will become more apparent upon reference to the following specification taken in connection with the accompanying drawings in which.

DETAILED DESCRIPTION OF THE INVENTION

Figure 2:
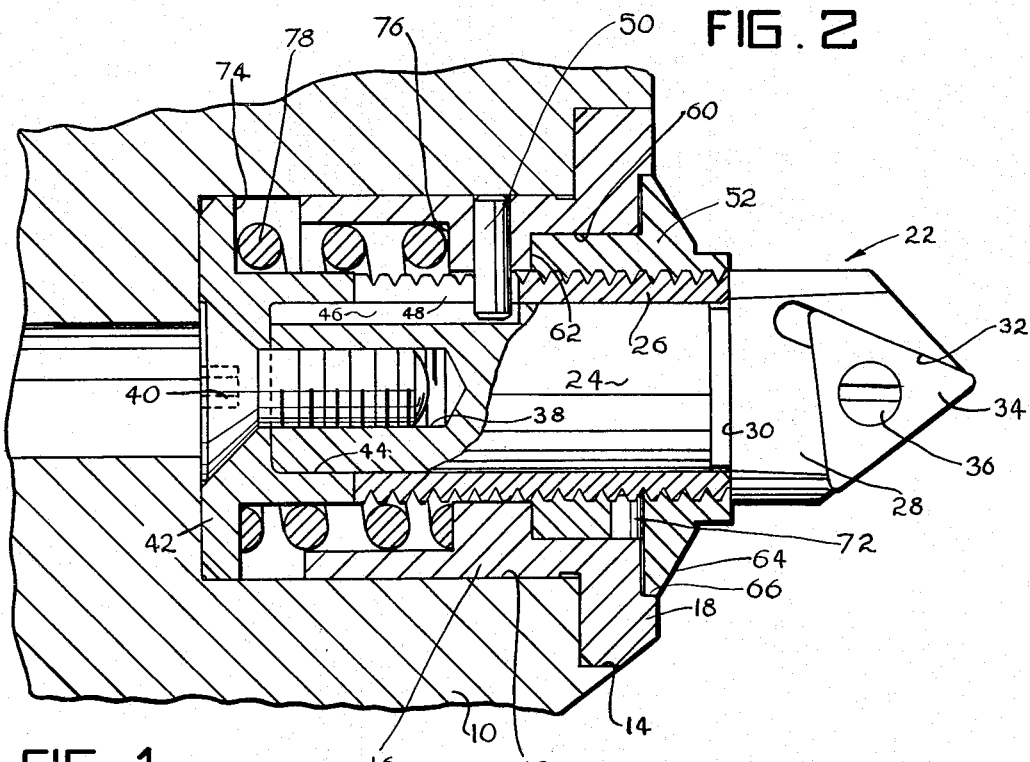
FIG. 2 is a plan section taken through the unit and is indicated by line II—II on FIG. 1.
Figure 1:
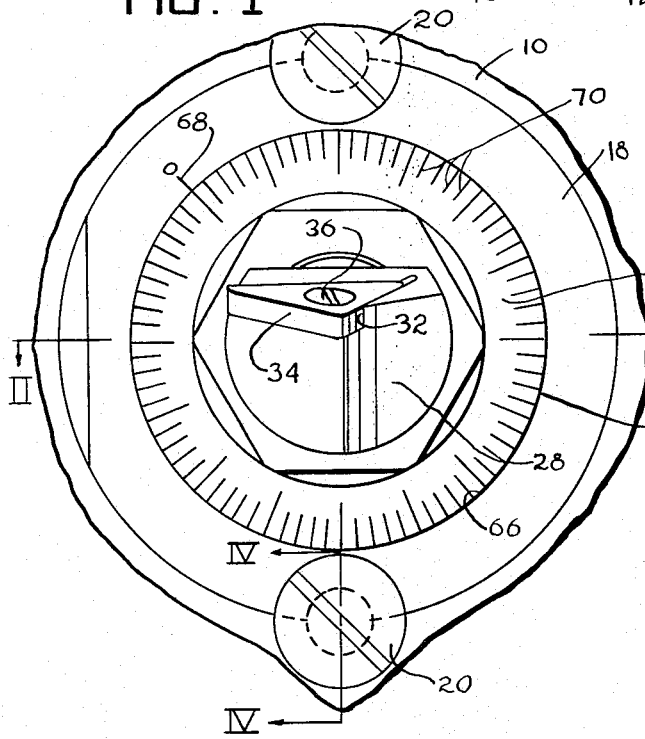
FIG. 1 is an end view of an adjustable cutting tool unit according to the present invention.

Referring to the drawings somewhat more in detail, in FIGS. 1 and 2, 10 represents a support member which may be in the form of a boring bar or a portion of a machine tool. Member 10 forms a rigid support for the unit of the present invention so that the unit can be presented to work to be turned.

Member 10 is provided with a cylindrical recess 12 counterbored at the outer end as at 14. The unit according to the present invention comprises an outer sleeve 16 receivable in recess 12 and having a flange 18 on one end receivable in counterbore 14.

As will be seen in FIG. 1, the sleeve is fixedly clamped in the recess as by cap screws 20 threaded into support member 10 and engaging flange 14 near the periphery thereof. Slidably mounted in sleeve 16 is a threaded element generally indicated at 22 and which comprises a central rod portion 24 and a tubular threaded portion 26 mounted on rod portion 26 in telescoping relation therewith.

Rod portion 24 has an enlarged end region 28 forming a shoulder 30 against which one end of threaded tubular portion 26 abuts. End portion 28 is also formed with a pocket 32 in which a cutting insert may be mounted as by a central clamp screw 36.

At the end of rod portion 24 opposite the cutting insert 34, there is provided a threaded hole 38 which receives a cone headed screw 40 which clamps a retainer element 42 on the end of rod portion 24. Retainer element 42 is provided with a socket 44 into which the adjacent end of rod portion 24 extends and between the bottom of which and the shoulder 30 the threaded tubular portion 26 is firmly clamped.

Rod portion 24 and threaded tubular portion 26 are provided with respective registering slots 46 and 48 and extending into the slots and closely fitting the slots is a pin 50 carried by sleeve 16. Pin 50 permits axial movement of threaded element 22 within the sleeve but prevents relative rotation therebetween.

On the end of the threaded portion 26 nearest the enlarged diameter end 28 of rod portion 24, there is threadedly mounted an adjusting nut 52. Adjusting nut 52 fits closely within a counterbore 60 provided in the end of the sleeve and at the axially inner end abuts the sleeve at the region indicated at 62. The nut 52 is provided with a graduated radial flange 64 which has the periphery disposed in a rather shallow recess 66 in the flanged outer end of the sleeve.

As will be seen in FIG. 1, the flanged outer end of the sleeve is provided with an index mark 68 and the inclined end face of the flange 64 of nut 52 is provided with indicia 70 so that the rotated position of the nut can readily be determined.

The nut preferably has a resistance element in the form of a plug 72 of nylon or the like bearing on the threads of threaded portion 26 so that the nut will be retained in adjusted positions on the threaded portion.

The retainer 42 has a shoulder 74 facing the left end of the sleeve and the sleeve has a shoulder 76 facing the retainer and a stiff compression spring 78 is provided bearing between the aforementioned shoulders.

In operation, when the sleeve is placed in a recess in a support member and it is clamped therein by the clamping bolts, axial adjustment of the threaded element within the sleeve can readily be accomplished by rotation of nut 52. A substantial amount of adjustment is available and, unless the unit has reached the limit of adjustment in one direction or the other, adjustment can be made in either direction with equal ease.

The spring 78 takes up all the lost motion in the device so that the graduations provided on the nut and the end of the sleeve can be relied on to indicate accurately the adjusted position of the threaded element within the sleeve.

It will be noted that the peaks of the threads on sleeve portion 26 are somewhat flattened and the outside diameter of these threads is closely receivable inside the reduced diameter region of sleeve 16. This provides support against lateral tilting movement of the threaded element in the sleeve and a holding of the threaded element against lateral deflection is still further enhanced by fitting nut 52 closely on the threads and closely fitting the cylindrical extension on the back of the nut in the cylindrical recess 60 provided in the sleeve.

Figure 3:
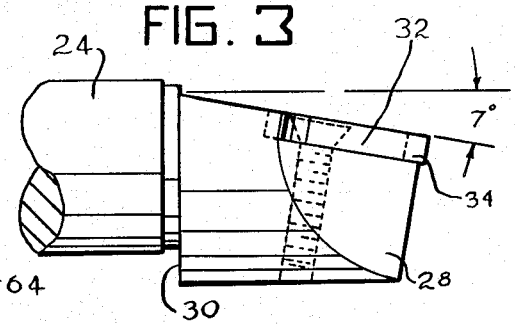
FIG. 3 is a side view showing the end of the portion of the device which is provided with a pocket for receiving a cutting insert.
Figure 4:
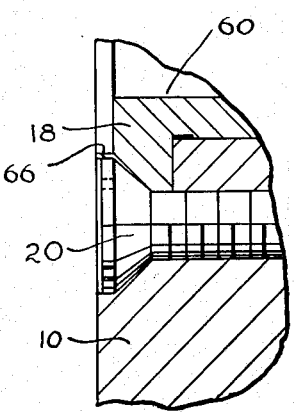
FIG. 4 is a fragmentary sectional view indicated by line IV—IV on FIG. 1 and showing the manner in which the unit is clamped to the support member therefor.

The mounting of the insert 34 on the enlarged end portion 28 of the rod-like portion 24 of the threaded element is substantially conventional, as will be noted in FIG. 3. In FIG. 3, which is a side view of enlarged portion 28, it will be noted that the insert may be inclined downwardly toward the front at an angle of about 7 degrees.

Depending upon the particular insert employed, however, this angle might vary substantially and might even be zero in the case of an insert with inclined side walls which would provide side clearance for the insert during a machining operation.

As will be noted in FIGS. 1 and 2, it is of advantage to provide the nut 52 with a polygonal wrench section for ease of rotary adjustment of the nut.

Modifications may be made within the scope of the appended claims.

What is claimed is:

1. In an adjustable cutting tool unit; an outer sleeve having securing means for connection thereof to a support member, a threaded tubular element slidable in the sleeve, a central rod member within the tubular element and having a first end portion protruding from one end of the tubular element, abutment means between said rod member and the said one end of said tubular element, sliding key means holding the tubular element and rod member against rotation in the sleeve, an adjusting nut threaded on said tubular element near said one end of the tubular element, interengaged elements of abutment means on the adjusting nut and the sleeve, a second end portion of the rod member, a spring retainer fixed to the second end portion of the rod member and having a first shoulder facing said sleeve, said sleeve having a second shoulder facing said retainer, and a compression spring bearing between said shoulders.

2. An adjustable cutting tool unit according to claim 1 in which said rod member protrudes axially beyond said nut and includes a pocket formed therein for receiving a cutting insert.

3. An adjustable cutting tool unit according to claim 1 in which the side of said retainer facing said rod member includes an axial socket formed therein receiving the adjacent end of said rod member, the said retainer at the open end of the socket providing an annular area which abuts the opposed end of said tubular element.

4. An adjustable cutting tool unit according to claim 1 in which said tubular element and rod member include registering slot means formed therein, said sliding key means comprising a pin in said sleeve extending radially into said slot means and keying said tubular element to said rod member and preventing rotation thereof in said sleeve while permitting axial movement thereof in said sleeve.

5. An adjustable cutting tool unit according to claim 1 in which said sleeve has an external flange thereon adapted for engagement by screw means for connection of the sleeve to a support member.

6. An adjustable cutting tool unit according to claim 1 which includes a support member, a recess formed in said suport member for receiving said unit, said sleeve having a flange thereon, said recess comprising a counterbore to receive said flange, and cap screws engaging said flange and threaded into said support member to connect the unit fixedly to said support member.

7. An adjustable cutting tool unit according to claim 6 in which said sleeve and retainer have the same outside diameter and said recess is a cylindrical recess.

* * * * *